United States Patent
Lu et al.

(10) Patent No.: US 12,398,479 B2
(45) Date of Patent: Aug. 26, 2025

(54) COPPER ELECTROPLATING BATHS CONTAINING REACTION PRODUCTS OF AMINES, POLYACRYLAMIDES AND BISEPOXOIDES

(71) Applicants: Dow Global Technologies LLC, Midland, MI (US); Rohm and Haas Electronic Materials LLC, Marlborough, MA (US)

(72) Inventors: Weijing Lu, Fanling (HK); Lingli Duan, Pudong District (CN); Zukhra Niazimbetova, Westborough, MA (US); Chen Chen, Pudong District (CN); Maria Rzeznik, Shrewsbury, MA (US)

(73) Assignees: Rohm and Haas Electronic Materials LLC, Marlborough, MA (US); Dow Global Technologies LLC, Midland, MI (US)

(*) Notice: Subject to any disclaimer, the term of this patent is extended or adjusted under 35 U.S.C. 154(b) by 490 days.

(21) Appl. No.: 16/780,939

(22) Filed: Feb. 4, 2020

(65) Prior Publication Data

US 2020/0179087 A1 Jun. 11, 2020
US 2021/0205052 A9 Jul. 8, 2021

Related U.S. Application Data

(62) Division of application No. 15/752,617, filed as application No. PCT/CN2015/091434 on Oct. 8, 2015, now Pat. No. 10,662,541.

(51) Int. Cl.
| | | |
|---|---|---|
| C25D 3/38 | (2006.01) | |
| C08G 59/22 | (2006.01) | |
| C08G 59/50 | (2006.01) | |
| C08G 73/02 | (2006.01) | |
| C25D 3/58 | (2006.01) | |
| C23C 18/16 | (2006.01) | |
| C25D 7/12 | (2006.01) | |

(52) U.S. Cl.
CPC ............ *C25D 3/38* (2013.01); *C08G 59/22* (2013.01); *C08G 59/502* (2013.01); *C08G 73/0206* (2013.01); *C08G 73/024* (2013.01); *C25D 3/58* (2013.01); *C23C 18/1653* (2013.01); *C25D 7/123* (2013.01)

(58) Field of Classification Search
None
See application file for complete search history.

(56) References Cited

U.S. PATENT DOCUMENTS

| | | | | |
|---|---|---|---|---|
| 2004/0138075 A1* | 7/2004 | Brown | ................ | C10M 159/12 |
| | | | | 508/225 |
| 2011/0220514 A1 | 9/2011 | Niazimbetova | | |
| 2014/0097092 A1* | 4/2014 | Roeger-Goepfert | .... | C08L 79/02 |
| | | | | 205/296 |
| 2015/0284865 A1 | 10/2015 | Kienle et al. | | |

* cited by examiner

*Primary Examiner* — Megan McCulley
(74) *Attorney, Agent, or Firm* — Jonathan D. Baskin

(57) ABSTRACT

Copper electroplating baths include reaction products of amines, polyacrylamides and bisepoxides. The reaction products function as levelers and enable copper electroplating baths which have high throwing power and provide copper deposits with reduced nodules.

9 Claims, No Drawings

COPPER ELECTROPLATING BATHS CONTAINING REACTION PRODUCTS OF AMINES, POLYACRYLAMIDES AND BISEPOXOIDES

The present application is a divisional application of co-pending application Ser. No. 15/752,617, filed Feb. 14, 2018.

FIELD OF THE INVENTION

The present invention is directed copper electroplating baths containing reaction products of amines, polyacrylamides and bisepoxides. More specifically, the present invention is directed to copper electroplating baths containing reaction products of amines, polyacrylamides and bisepoxides which have high throwing power and copper deposits with reduced nodules.

BACKGROUND OF THE INVENTION

Methods for electroplating articles with metal coatings generally involve passing a current between two electrodes in a plating solution where one of the electrodes is the article to be plated. A typical acid copper electroplating solution includes dissolved copper, usually copper sulfate, an acid electrolyte such as sulfuric acid in an amount sufficient to impart conductivity to the bath, a source of halide, and proprietary additives to improve the uniformity of the plating and the quality of the metal deposit. Such additives include levelers, accelerators and suppressors, among others.

Electrolytic copper plating solutions are used in a variety of industrial applications, such as decorative and anticorrosion coatings, as well as in the electronics industry, particularly for the fabrication of printed circuit boards and semiconductors. For circuit board fabrication, typically, copper is electroplated over selected portions of the surface of a printed circuit board, into blind vias and trenches and on the walls of through-holes passing between the surfaces of the circuit board base material. The exposed surfaces of blind vias, trenches and through-holes, i.e., the walls and the floor, are first made conductive, such as by electroless metallization, before copper is electroplated on surfaces of these apertures. Plated through-holes provide a conductive pathway from one board surface to the other. Vias and trenches provide conductive pathways between circuit board inner layers. For semiconductor fabrication, copper is electroplated over a surface of a wafer containing a variety of features such as vias, trenches or combinations thereof. The vias and trenches are metallized to provide conductivity between various layers of the semiconductor device.

It is well known in certain areas of plating, such as in electroplating of printed circuit boards ("PCBs"), that the use of levelers in the electroplating bath can be crucial in achieving a uniform metal deposit on a substrate surface. Electroplating a substrate having irregular topography can pose difficulties. During electroplating a voltage drop typically occurs within apertures in a surface, which can result in an uneven metal deposit between the surface and the apertures. Electroplating irregularities are exacerbated where the voltage drop is relatively extreme, that is, where the apertures are narrow and tall. Consequently, depositing a metal layer of substantially uniform thickness is frequently a challenging step in the manufacture of electronic devices.

Leveling agents are often used in copper plating baths to provide substantially uniform, or level, copper layers in electronic devices.

The trend of portability combined with increased functionality of electronic devices has driven the miniaturization of PCBs. Conventional multilayer PCBs with through-hole interconnects are not always a practical solution. Alternative approaches for high density interconnects have been developed, such as sequential build up technologies, which utilize blind vias. One of the objectives in processes that use blind vias is the maximizing of via filling while minimizing thickness variation in the copper deposit between the vias and the substrate surface. This is particularly challenging when the PCB contains both through-holes and blind vias.

Leveling agents are used in copper plating baths to level the deposit across the substrate surface and to improve the throwing power of the electroplating bath. Throwing power is defined as the ratio of the through-hole center copper deposit thickness to its thickness at the surface. Newer PCBs are being manufactured that contain both through-holes and blind vias. Current bath additives, in particular current leveling agents, do not always provide level copper deposits between the substrate surface and filled through-holes and blind vias. Via fill is characterized by the difference in height between the copper in the filled via and the surface. Accordingly, there remains a need in the art for leveling agents for use in metal electroplating baths for the manufacture of PCBs that provide level copper deposits while bolstering the throwing power of the bath.

SUMMARY OF THE INVENTION

A reaction product of a bisepoxide, an amine and an acrylamide, wherein the amine has a formula:

(I)

where R' is selected from hydrogen or a moiety: —$CH_2$—$CH_2$—; R is selected from $H_2N$—$(CH_2)_m$—, HO—$(CH_2)_m$—, —HN—$CH_2$—$CH_2$—, Q-$(CH_2)_m$—, a moiety having a structure:

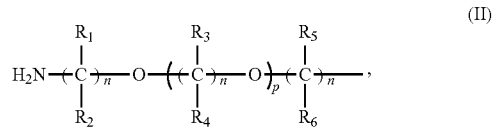

(II)

a moiety having a structure:

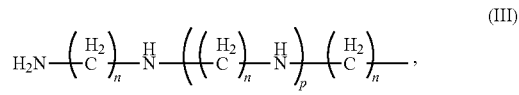

(III)

or a moiety having a structure:

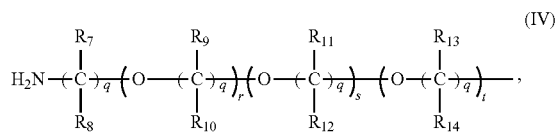
(IV)

where $R_1$-$R_{14}$ are independently chosen from hydrogen and $(C_1$-$C_3)$alkyl; m is an integer from 2-12, n is an integer from 2-10, p is an integer from 1-10, q is an integer from 2-10 and r, s and t are numbers from 1 to 10; Q is a 5-6 membered heterocyclic ring having one or two nitrogen atoms in the ring or Q is a benzene sulfonamide moiety; and with a proviso that when R' is —$CH_2$—$CH_2$—, R is —HN—$CH_2$—$CH_2$— and the nitrogen of R forms a covalent bond with a carbon atom of R' to form a heterocyclic ring; and the acrylamide has a formula:

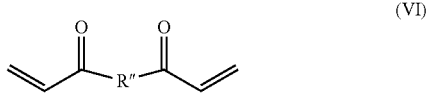
(VI)

where R" is a moiety having a structure:

(VII)

a moiety having a structure:

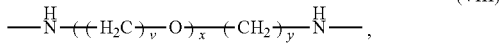
(VIII)

a moiety having a structure:

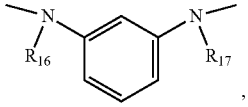
(IX)

or
a substituted or unsubstituted triazinane ring or a piperazine ring, wherein $R_{15}$ is selected from hydrogen or hydroxyl; u is an integer from 1 to 2 and v, x and y are independently integers of 1 to 10; $R_{16}$ and $R_{17}$ are chosen from hydrogen and carbonyl moiety, and with the proviso that when $R_{16}$ and $R_{17}$ are carbonyl moieties, the carbonyl moieties form a covalent bond with the carbons of the vinyl groups of formula (VI) displacing a hydrogen to form the covalent bond with the carbons of the vinyl groups to form a five membered heterocyclic ring.

An electroplating bath includes one or more sources of copper ions, one or more accelerators, one or more suppressors, one or more electrolytes and one or more reaction products as disclosed above.

A method of electroplating includes providing a substrate; immersing the substrate in the electroplating bath disclosed above; applying a current to the substrate and the electroplating bath; and electroplating copper on the substrate.

The reaction products provide copper layers having a substantially level surface across a substrate, even on substrates having small features and on substrates having a variety of feature sizes. The electroplating methods effectively deposit copper on substrates and in blind vias and through-holes such that the copper plating baths have high throwing power. In addition, the copper deposits have reduced nodules.

DETAILED DESCRIPTION OF THE INVENTION

As used throughout this specification the following abbreviations shall have the following meanings unless the context clearly indicates otherwise: A=amperes; $A/dm^2$=amperes per square decimeter; ° C.=degrees Centigrade; g=gram; ppm=parts per million=mg/L; L=liter, μm=micron=micrometer; mm=millimeters; cm=centimeters; DI=deionized; mL=milliliter; mol=moles; mmol=millimoles; Mw=weight average molecular weight; Mn=number average molecular weight;

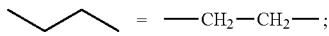

PCB=printed circuit board. All numerical ranges are inclusive and combinable in any order, except where it is clear that such numerical ranges are constrained to add up to 100%.

As used throughout the specification, "feature" refers to the geometries on a substrate. "Aperture" refers to recessed features including through-holes and blind vias. As used throughout this specification, the term "plating" refers to electroplating. "Deposition" and "plating" are used interchangeably throughout this specification. "Leveler" refers to an organic compound or salt thereof that is capable of providing a substantially level or planar metal layer. The terms "leveler" and "leveling agent" are used interchangeably throughout this specification. "Accelerator" refers to an organic additive that increases the plating rate of the electroplating bath. "Suppressor" refers to an organic additive that suppresses the plating rate of a metal during electroplating. The terms "printed circuit boards" and "printed wiring boards" are used interchangeably throughout this specification. The term "moiety" means a part of a molecule or polymer that may include either whole functional groups or parts of functional groups as substructures. The terms "moiety" and "group" are used interchangeably throughout the specification. The articles "a" and "an" refer to the singular and the plural.

Compounds are reaction products of amines, acrylamides and bisepoxides. Amines of the present invention have a formula:

(I)

where R' is selected from hydrogen or a moiety —$CH_2$—$CH_2$—, preferably R' is hydrogen; R is selected from $H_2N$—

—(CH$_2$)$_m$—, HO—(CH$_2$)$_m$—, —HN—CH$_2$—CH$_2$—, Q-(CH$_2$)$_m$—, a moiety having a structure:

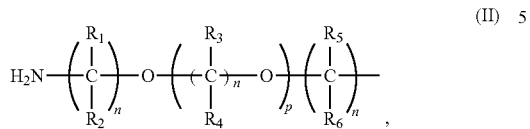
(II)

a moiety having a structure:

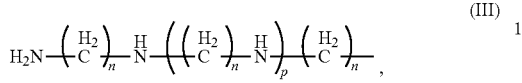
(III)

or
a moiety having a structure:

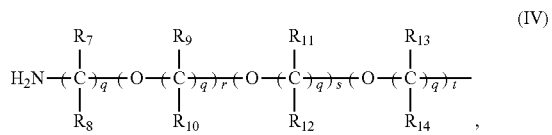
(IV)

where R$_1$-R$_{14}$ are independently chosen from hydrogen and (C$_1$-C$_3$)alkyl, preferably R$_1$-R$_6$ are independently chosen from hydrogen and methyl, more preferably R$_1$-R$_6$ are chosen from hydrogen; preferably R$_7$-R$_{14}$ are independently chosen from hydrogen and methyl; m is an integer from 2-12, preferably from 2-3, n is an integer from 2-10, preferably 2-5, p is an integer from 1-10, preferably 1-5, more preferably from 1-4, q is an integer from 2-10 and r, s and t are independently numbers from 1 to 10; Q is a 5-6 membered heterocyclic ring having one or two nitrogen atoms in the ring such as an imidazole or pyridine moiety, or Q is a benzene sulfonamide moiety having formula (V) below; and with a proviso that when R' is —CH$_2$—CH$_2$—, R is —HN—CH$_2$—CH$_2$— and the nitrogen of R forms a covalent bond with a carbon of R' to form a heterocyclic ring such as a piperazine ring. Most preferably, R' is hydrogen and R is formula (II) above.

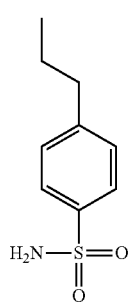
(V)

Amines having formula (I) include, but are not limited to ethylene diamine, aminoethan-1-ol, 2,2'-(ethylenedioxy)bis(ethylamine), 3,3'-(butane-1,4-dihylbis(oxy))bis(propan-1-amine), poly(1-(2-((3-(2-aminopropoxy)butan-2-yl)oxy)ethoxy)propan-2-amine) and 4-(2-aminoethyl)benzene sulfonamide.

When n is 2 and p is 5 a preferred compound having moiety (II) is 6,8,11,15,17-pentamethyl-4,7,10,13,16,19-hexaoxadocosane-2,21-diamine which has the following structure:

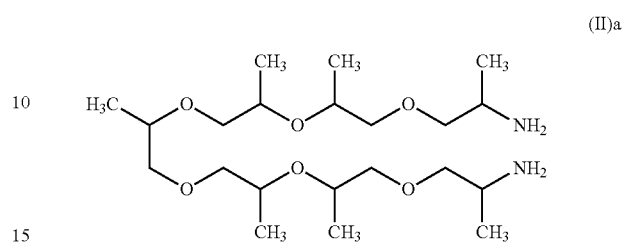
(II)a

A preferred compound having moiety (IV) has the following structure:

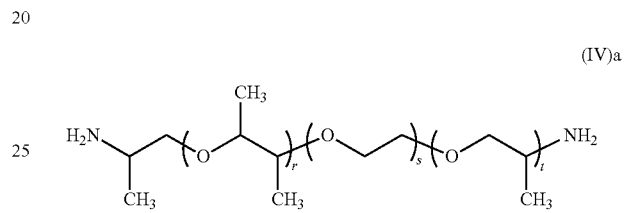
(IV)a where the variables r, s and t are defined above. Preferably the Mw ranges from 200 g/mole to 2000 g/mole.

Acrylamides include compounds having a formula:

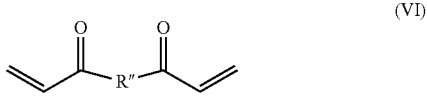
(VI)

wherein R" is a moiety having a structure:

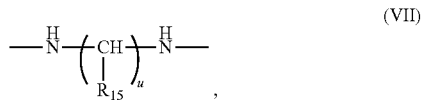
(VII)

a moiety having a structure:

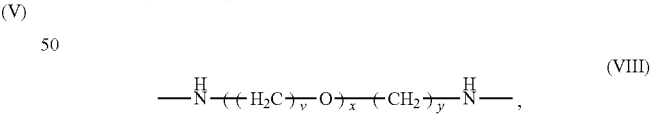
(VIII)

a moiety having a structure:

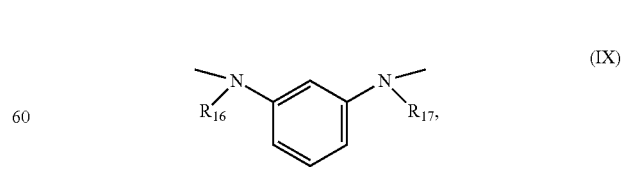
(IX)

or a substituted or unsubstituted triazinane ring or a piperazine ring, wherein R$_{15}$ is selected from hydrogen or hydroxyl, preferably R$_{15}$ is hydrogen; u is an integer from 1 to 2, preferably 1, and v, x and y are independently integers of 1 to 10; $R_{16}$ and $R_{17}$ are independently chosen from hydrogen and carbonyl moiety with the proviso that when $R_{16}$ and $R_{17}$ are carbonyl moieties, the carbonyl moieties form a covalent bond with the carbons of the vinyl groups of formula (VI) displacing a hydrogen to form the covalent bond with the carbons of the vinyl groups and form a five membered heterocyclic ring having formula:

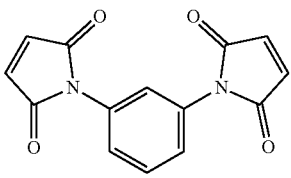

(X)

Preferably, bisepoxides have the following formula:

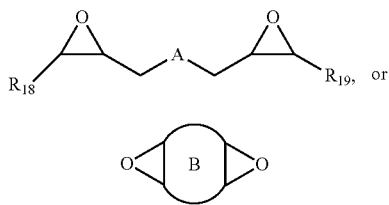

(XI)

or (XII)

where $R_{18}$ and $R_{19}$ may be the same or different and are chosen from hydrogen and $(C_1-C_4)$alkyl, $A=OR_{20}$ or $R_{21}$; $R_{20}=((CR_{22}R_{23})_aO)_b$, $(aryl-O)_d$, $CR_{22}R_{23}$—Z—$CR_{22}CR_{23}$, or $OZ'_fO$, $R_{21}=(CH_2)_g$, B is $(C_5-C_{12})$cycloalkyl, Z=a 5- or 6-membered ring, Z' is $R_{24}OArOR_{24}$, $(R_{25}O)_hAr(OR_{25})$, or $(R_{25}O)_h$, $Cy(OR_{25})$, $Cy=(C_5-C_{12})$cycloalkyl; each $R_{22}$ and $R_{23}$ are independently chosen from hydrogen, methyl, or hydroxyl, each $R_{24}$ represents $(C_1-C_8)$alkyl, each $R_{25}$ represents a $(C_2-C_6)$alkyleneoxy; $R_{26}$ is a hydrogen atom, a formyl group, or one or two glycidyl ether groups each optionally containing a carbonyl group constituted by $C_4-C_8$ and $C_2-C_4$, $R_{27}$ is a hydrogen atom, a methyl group or an ethyl group, and $R_{28}$ is a hydrogen atom, a formyl group, or one or two glycidyl ether groups each optionally containing a carbonyl group constituted by $C_4-C_8$ and $C_2-C_4$, each a=1-6, b=1-20, d=1-6, f=1-4, g=0-6 and h=1-10. $R_{18}$ and $R_{19}$ are preferably independently chosen from hydrogen and $(C_1-C_2)$alkyl. When $R_{18}$ and $R_{19}$ are not joined to form a cyclic compound, it is preferred that $R_{18}$ and $R_{19}$ are both hydrogen. When $R_{18}$ and $R_{19}$ are joined to form a cyclic compound, it is preferred that A is $R_{21}$ or a chemical bond and that a $(C_8-C_{10})$carbocyclic ring is formed. It is preferred that a=2-4. Phenyl-O is the preferred aryl-O group for $R_{20}$. It is preferred that d=1-4, more preferably 1-3, and still more preferably 1-2. Z is preferably a 5- or 6-membered carbocyclic ring and, more preferably, Z is a 6-membered carbocyclic ring. Preferably, g=0-4, and more preferably, 1-4. When $A=R_{20}$ and g=0, then A is a chemical bond. Preferably, $Z'=R_{24}OArOR_{24}$ or $(R_{25}O)_hAr(OR_{25})$. Each $R_{24}$ is preferably $(C_1-C_6)$alkyl and more preferably $(C_1-C_4)$alkyl. Each $R_{25}$ is preferably $(C_2-C_4)$alkyleneoxy. It is preferred that f=1-2. Preferably, h=1-8, more preferably, 1-6, and most preferably, 1-4. Each Ar group may be substituted with one or more substituent groups which include, but are not limited to, $(C_1-C_4)$alkyl, $(C_1-C_4)$alkoxy or halogen. Preferably Ar is $(C_6-C_{15})$aryl. Exemplary aryl groups are phenyl, methylphenyl, naphthyl, pyridinyl, bisphenylmethyl and 2,2-bisphenylpropyl. Preferably Cy is $(C_6-C_{15})$cycloalkyl. The $(C_5-C_{12})$cycloalkyl groups for B may be monocyclic, spirocyclic, fused or bicyclic groups. Preferably B is a $(C_8-C_{10})$cycloalkyl, more preferably, cyclooctyl. Preferably, $R_{26}$ and $R_{28}$ are independently a hydrogen atom or a glycidyl ether group and $R_{27}$ is a hydrogen atom or an ethyl group.

Compounds of formula (XII) include, but are not limited to, dicyclopentadiene dioxide and 1,2,5,6-diepoxycyclooctane.

Bisepoxides where $A=O((CR_{22}R_{23})_aO)_b$ have a formula:

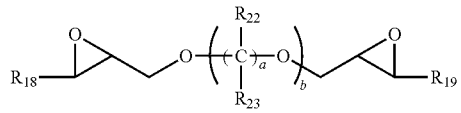

(XIII)

where $R_{18}$, $R_{119}$, $R_{22}$, $R_{23}$, a and b are as defined above. Preferably, $R_{18}$ and $R_{19}$ are hydrogen. Preferably $R_{22}$ and $R_{23}$ are the same or different and are chosen from hydrogen, methyl and hydroxyl. More preferably $R_{22}$ is hydrogen, and $R_{23}$ is hydrogen or hydroxyl. Preferably a is an integer of 2-4 and b is an integer of 1-2. More preferably a is 3-4 and b is 1.

Compounds of formula (XIII) include, but are not limited to, 1,4-butanediol diglycidyl ether, ethylene glycol diglycidyl ether, diethylene glycol diglycidyl ether, glycerol diglycidyl ether, neopentyl glycol diglycidyl ether, propylene glycol diglycidyl ether, dipropylene glycol diglycidyl ether, poly(ethylene glycol) diglycidyl ether and poly(propyleneglycol) diglycidyl ether.

The reaction products of the present invention may be prepared by Michael addition. Amines function as Michael addition donors and acrylamides are Michael addition acceptors. In general, the order of addition of reactants to a reaction vessel may vary; however, preferably, one or more acrylamides are dissolved in a solvent such as ethanol or isopropanol at room temperature followed by adding one or more amines. The reaction is allowed to proceed for 12-24 hours. One or more bisepoxides is then added to the reaction mixture. The mixture is heated at temperatures from 90-120° C. Heating with stirring is done for 0.5 hours to 4 hours. In general, the molar ratio of amine to acrylamide to bisepoxide is 1:1:2; however, this ratio may vary depending on the specific reactants. Minor experimentation may be done to find the preferred reactant molar ratios for particular reactants.

The electroplating baths and methods which include one or more of the reaction products are useful in providing a substantially level plated metal layer on a substrate, such as a printed circuit board or semiconductor chip. Also, the plating baths and methods are useful in filling apertures in a substrate with metal. The copper deposits have good throwing power and reduced nodule formation.

Any substrate upon which copper can be electroplated may be used as a substrate with the copper plating baths containing the reaction products. Such substrates include, but are not limited to: printed wiring boards, integrated circuits, semiconductor packages, lead frames and interconnects. An integrated circuit substrate may be a wafer used in a dual damascene manufacturing process. Such substrates typically contain a number of features, particularly apertures, having a variety of sizes. Through-holes in a PCB may have a variety of diameters, such as from 50 μm to 350 μm in diameter. Such through-holes may vary in depth, such as from 0.8 mm to 10 mm. PCBs may contain blind vias having a wide variety of sizes, such as up to 200 μm diameter and 150 μm depth, or greater.

The copper plating baths contain a source of copper ions, an electrolyte, and a leveling agent, where the leveling agent is a reaction product of one or more amines and one or more acrylamides as described above. The copper plating baths may contain a source of halide ions, an accelerator and a suppressor. Optionally, in addition to copper, the electroplating baths may include one or more sources of tin for electroplating a copper/tin alloy. Preferably the electroplating baths are copper electroplating baths.

Suitable copper ion sources are copper salts and include without limitation: copper sulfate; copper halides such as copper chloride; copper acetate; copper nitrate; copper tetrafluoroborate; copper alkylsulfonates; copper aryl sulfonates; copper sulfamate; copper perchlorate and copper gluconate. Exemplary copper alkane sulfonates include copper ($C_1$-$C_6$)alkane sulfonate and more preferably copper ($C_1$-$C_3$)alkane sulfonate. Preferred copper alkane sulfonates are copper methanesulfonate, copper ethanesulfonate and copper propanesulfonate. Exemplary copper arylsulfonates include, without limitation, copper benzenesulfonate and copper p-toluenesulfonate. Mixtures of copper ion sources may be used. One or more salts of metal ions other than copper ions may be added to the present electroplating baths. Typically, the copper salt is present in an amount sufficient to provide an amount of copper metal of 10 to 400 g/L of plating solution.

Suitable tin compounds include, but are not limited to salts, such as tin halides, tin sulfates, tin alkane sulfonate such as tin methane sulfonate, tin aryl sulfonate such as tin benzenesulfonate and tin p-toluenesulfonate. The amount of tin compound in these electrolyte compositions is typically an amount that provides a tin content in the range of 5 to 150 g/L. Mixtures of tin compounds may be used in an amount as described above.

The electrolyte useful in the present invention is acidic. Preferably, the pH of the electrolyte is ≤2. Suitable acidic electrolytes include, but are not limited to, sulfuric acid, acetic acid, fluoroboric acid, alkanesulfonic acids such as methanesulfonic acid, ethanesulfonic acid, propanesulfonic acid and trifluoromethane sulfonic acid, aryl sulfonic acids such as benzenesulfonic acid, p-toluenesulfonic acid, sulfamic acid, hydrochloric acid, hydrobromic acid, perchloric acid, nitric acid, chromic acid and phosphoric acid. Mixtures of acids may be advantageously used in the present metal plating baths. Preferred acids include sulfuric acid, methanesulfonic acid, ethanesulfonic acid, propanesulfonic acid, hydrochloric acid and mixtures thereof. The acids may be present in an amount in the range of 1 to 400 g/L. Electrolytes are generally commercially available from a variety of sources and may be used without further purification.

Such electrolytes may optionally contain a source of halide ions. Typically chloride ions are used. Exemplary chloride ion sources include copper chloride, tin chloride, sodium chloride, potassium chloride and hydrochloric acid. A wide range of halide ion concentrations may be used in the present invention. Typically, the halide ion concentration is in the range of 0 to 100 ppm based on the plating bath. Such halide ion sources are generally commercially available and may be used without further purification.

The plating compositions typically contain an accelerator. Any accelerators (also referred to as brightening agents) are suitable for use in the present invention. Such accelerators are well-known to those skilled in the art. Accelerators include, but are not limited to, N,N-dimethyl-dithiocarbamic acid-(3-sulfopropyl)ester; 3-mercapto-propylsulfonic acid-(3-sulfopropyl)ester; 3-mercapto-propylsulfonic acid sodium salt; carbonic acid, dithio-O-ethylester-S-ester with 3-mercapto-1-propane sulfonic acid potassium salt; bis-sulfopropyl disulfide; bis-(sodium sulfopropyl)-disulfide; 3-(benzothiazolyl-S-thio)propyl sulfonic acid sodium salt; pyridinium propyl sulfobetaine; 1-sodium-3-mercaptopropane-1-sulfonate; N,N-dimethyl-dithiocarbamic acid-(3-sulfoethyl)ester; 3-mercapto-ethyl propylsulfonic acid-(3-sulfoethyl)ester; 3-mercapto-ethylsulfonic acid sodium salt; carbonic acid-dithio-O-ethylester-S-ester with 3-mercapto-1-ethane sulfonic acid potassium salt; bis-sulfoethyl disulfide; 3-(benzothiazolyl-S-thio)ethyl sulfonic acid sodium salt; pyridinium ethyl sulfobetaine; and 1-sodium-3-mercaptoethane-1-sulfonate. Accelerators may be used in a variety of amounts. In general, accelerators are used in an amount in a range of 0.1 ppm to 1000 ppm.

Any compound capable of suppressing the metal plating rate may be used as a suppressor in the present electroplating compositions. Suitable suppressors include, but are not limited to, polypropylene glycol copolymers and polyethylene glycol copolymers, including ethylene oxide-propylene oxide ("EO/PO") copolymers and butyl alcohol-ethylene oxide-propylene oxide copolymers. Suitable butyl alcohol-ethylene oxide-propylene oxide copolymers are those having a weight average molecular weight of 100 to 100,000 g/mole, preferably 500 to 10,000 g/mole. When such suppressors are used, they are typically present in an amount in the range of 1 to 10,000 ppm based on the weight of the composition, and more typically from 5 to 10,000 ppm. The leveling agents of the present invention may also possess functionality capable of acting as suppressors.

In general, the reaction products have a number average molecular weight (Mn) of 200 to 100,000 g/mole, typically from 300 to 50,000 g/mole, preferably from 500 to 30,000 g/mole, although reaction products having other Mn values may be used. Such reaction products may have a weight average molecular weight (Mw) value in the range of 1000 to 50,000 g/mole, typically from 5000 to 30,000 g/mole, although other Mw values may be used.

The amount of the reaction product, i.e., leveling agent, used in the electroplating baths depends upon the particular leveling agents selected, the concentration of the metal ions in the electroplating bath, the particular electrolyte used, the concentration of the electrolyte and the current density applied. In general, the total amount of the leveling agent in the electroplating baths ranges from 0.01 ppm to 1000 ppm, preferably from 0.1 ppm to 250 ppm, most preferably from 0.5 ppm to 150 ppm, based on the total weight of the plating bath, although greater or lesser amounts may be used.

The electroplating baths may be prepared by combining the components in any order. It is preferred that the inorganic components such as source of metal ions, water, electrolyte and optional halide ion source are first added to the bath vessel, followed by the organic components such as leveling agent, accelerator, suppressor, and any other organic component.

The electroplating baths may optionally contain at least one additional leveling agent. Such additional leveling agents may be another leveling agent of the present invention, or alternatively, may be any conventional leveling agent. Suitable conventional leveling agents that can be used in combination with the present leveling agents include, without limitations, those disclosed in U.S. Pat. No. 6,610,192 to Step et al., U.S. Pat. No. 7,128,822 to Wang et al., U.S. Pat. No. 7,374,652 to Hayashi et al. and U.S. Pat. No. 6,800,188 to Hagiwara et al. Such combination of leveling agents may be used to tailor the characteristics of the plating bath, including leveling ability and throwing power.

Typically, the plating baths may be used at any temperature from 10 to 65° C. or higher. Preferably, the temperature of the plating bath is from 10 to 35° C. and more preferably from 15 to 30° C.

In general, the electroplating baths are agitated during use. Any suitable agitation method may be used and such methods are well-known in the art. Suitable agitation methods include, but are not limited to: air sparging, work piece agitation, and impingement.

Typically, a substrate is electroplated by contacting the substrate with the plating bath. The substrate typically functions as the cathode. The plating bath contains an anode, which may be soluble or insoluble. Potential is typically applied to the electrodes. Sufficient current density is applied and plating performed for a period of time sufficient to deposit a metal layer having a desired thickness on the substrate as well as to fill blind vias, trenches and through-holes, or to conformally plate through-holes. Current densities may range from 0.05 to 10 A/dm$^2$, although higher and lower current densities may be used. The specific current density depends in part upon the substrate to be plated, the composition of the plating bath, and the desired surface metal thickness. Such current density choice is within the abilities of those skilled in the art.

An advantage of the present invention is that substantially level metal deposits are obtained on a PCB. Through-holes, blind vias or combinations thereof in the PCB are substantially filled or through-holes are conformally plated with desirable throwing power. A further advantage of the present invention is that a wide range of apertures and aperture sizes may be filled or conformally plated with desirable throwing power.

Throwing power is defined as the ratio of the average thickness of the metal plated in the center of a through-hole compared to the average thickness of the metal plated at the surface of the PCB sample and is reported as a percentage. The higher the throwing power, the better the plating bath is able to conformally plate the through-hole. Metal plating compositions of the present invention have a throwing power of ≥45%, preferably ≥60%.

The reaction products provide copper and copper/tin layers having a substantially level surface across a substrate, even on substrates having small features and on substrates having a variety of feature sizes. The plating methods effectively deposit metals in through-holes such that the electroplating baths have good throwing power.

While the methods of the present invention have been generally described with reference to printed circuit board manufacture, it is appreciated that the present invention may be useful in any electrolytic process where an essentially level or planar copper or copper/tin deposit and filled or conformally plated apertures are desired. Such processes include semiconductor packaging and interconnect manufacture.

The following examples are intended to further illustrate the invention but are not intended to limit its scope.

Example 1

10 mmol N,N'-Methylenebis(acrylamide) was added into a 100 mL three neck flask followed by 20 mL ethanol. The mixture was stirred at room temperature then 10 mmol 2,2'-(ethylenedioxy)bis(ethylamine) was added to the mixture. Some white solid N,N'-Methylenebis(acrylamide) which had poor solubility in ethanol was present in the solution. The reaction mixture was kept at room temperature overnight (about 24 hours) and the solution became clear and slightly yellow. 20 mmol poly(ethylene glycol) diglycidyl ether was added to the mixture followed by another 10 mL ethanol. The reaction mixture was heated up in an oil bath at 110° C. All the ethanol was removed at this temperature over a period of 2 hours. The resulting sticky mixture was stirred at 110° C. for another 0.5 hours. A yellow gel was obtained. 200 mL water was added into the mixture and 60 mL concentrated sulfuric acid was added to the mixture. The mixture was heated until a clear solution was obtained as the final product. Reaction product 1 was use without purification.

Example 2

A plurality of copper electroplating baths were prepared by combining 75 g/L copper as copper sulfate pentahydrate, 240 g/L sulfuric acid, 60 ppm chloride ion, 1 ppm of an accelerator and 1.5 g/L of a suppressor. The accelerator was bis(sodium-sulfopropyl)disulfide. The suppressor was an EO/PO copolymer having a weight average molecular weight of <5,000 g/mole and terminal hydroxyl groups. Each electroplating bath also contained reaction product 1 in amounts from 1 ppm to 50 ppm as shown in the table in Example 3 below.

Example 3

Samples of 3.2 mm thick, double-sided FR4 PCBs, 5 cm×9.5 cm, having a plurality of through-holes were electroplated with copper in Haring cells using the copper electroplating baths of Example 2. The samples had 0.25 mm diameter through-holes. The temperature of each bath was 25° C. A current density of 3 A/dm$^2$ was applied to the samples for 40 minutes. The copper plated samples were analyzed to determine the throwing power ("TP") of the plating baths, and the number of nodules on the copper deposits.

Throwing power was calculated by determining the ratio of the average thickness of the copper plated in the center of a through-hole compared to the average thickness of the copper plated at the surface of the PCB sample. The throwing power was reported as a percentage.

| Reaction Product | Leveler (ppm) | % TP | Nodules |
|---|---|---|---|
| 1 | 1 | 59 | 0 |
|   | 5 | 62 | 1 |
|   | 10 | 67 | 0 |
|   | 30 | 64 | 1 |
|   | 50 | 63 | 0 |

The results showed that the throwing power exceeded 45% indicating good throwing power performance for the reaction products. Most of the samples had % TP exceeding 60%. In addition, the number of nodules observed on the copper deposits was very low. Three samples showed no observable nodules and only one nodule was observed on two samples.

Example 4

The method of Example 1 is repeated except the bisepoxide added to the reaction mixture is 20 mmol of poly(propyleneglycol) diglycidyl ether. Reaction product 2 is used without purification.

A plurality of copper electroplating baths are then prepared by combining 75 g/L copper as copper sulfate pentahydrate, 240 g/L sulfuric acid, 60 ppm chloride ion, 1 ppm of an accelerator and 1.5 g/L of a suppressor. The accelerator is bis(sodium-sulfopropyl)disulfide. The suppressor is an EO/PO copolymer having a weight average molecular weight of <5,000 and terminal hydroxyl groups. Each electroplating bath also contains reaction product 2 in amounts of 1 ppm, 5 ppm, 10 ppm, 30 ppm or 50 ppm.

Samples of 3.2 mm thick, double-sided FR4 PCBs, 5 cm×9.5 cm, having a plurality of through-holes are electroplated with copper in Haring cells using the copper electroplating baths. The samples have 0.25 mm diameter through-holes. The temperature of each bath is 25° C. A current density of 3 A/dm² is applied to the samples for 40 minutes. The copper plated samples are analyzed as described in Example 3 above to determine the throwing power ("TP") of the plating baths, and the number of nodules on the copper deposits. The % TP for each bath is expected to be greater than 45% and no nodules are expected to be seen on the copper deposits.

Example 5

The method of Example 1 is repeated except the bisepoxide added to the reaction mixture is 20 mmol of 1,4-butanediol diglycidyl ether. Reaction product 3 is used without purification.

A plurality of copper electroplating baths are then prepared by combining 75 g/L copper as copper sulfate pentahydrate, 240 g/L sulfuric acid, 60 ppm chloride ion, 1 ppm of an accelerator and 1.5 g/L of a suppressor. The accelerator is bis(sodium-sulfopropyl)disulfide. The suppressor is an EO/PO copolymer having a weight average molecular weight of <5,000 g/mole and terminal hydroxyl groups. Each electroplating bath also contains reaction product 3 in amounts of 1 ppm, 5 ppm, 10 ppm, 30 ppm or 50 ppm.

Samples of 3.2 mm thick, double-sided FR4 PCBs, 5 cm×9.5 cm, having a plurality of through-holes are electroplated with copper in Haring cells using the copper electroplating baths. The samples have 0.25 mm diameter through-holes. The temperature of each bath is 25° C. A current density of 3 A/dm² is applied to the samples for 40 minutes. The copper plated samples are analyzed as described in Example 3 above to determine the throwing power ("TP") of the plating baths, and the number of nodules on the copper deposits. The % TP for each bath is expected to be greater than 45% and no nodules are expected to be seen on the copper deposits.

Example 6

The method of Example 1 is repeated except the bisepoxide added to the reaction mixture is 20 mmol of glycerol diglycidyl ether. Reaction product 3 is used without purification.

A plurality of copper electroplating baths are then prepared by combining 75 g/L copper as copper sulfate pentahydrate, 240 g/L sulfuric acid, 60 ppm chloride ion, 1 ppm of an accelerator and 1.5 g/L of a suppressor. The accelerator is bis(sodium-sulfopropyl)disulfide. The suppressor is an EO/PO copolymer having a weight average molecular weight of <5,000 g/mole and terminal hydroxyl groups. Each electroplating bath also contains reaction product 4 in amounts of 1 ppm, 5 ppm, 10 ppm, 30 ppm or 50 ppm.

Samples of 3.2 mm thick, double-sided FR4 PCBs, 5 cm×9.5 cm, having a plurality of through-holes are electroplated with copper in Haring cells using the copper electroplating baths. The samples have 0.25 mm diameter through-holes. The temperature of each bath is 25° C. A current density of 3 A/dm² is applied to the samples for 40 minutes. The copper plated samples are analyzed as described in Example 3 above to determine the throwing power ("TP") of the plating baths, and the number of nodules on the copper deposits. The % TP for each bath is expected to be greater than 45% and no nodules are expected to be seen on the copper deposits.

What is claimed is:

1. A reaction product of a bisepoxide, an amine and an acrylamide, wherein the amine has a formula:

(I)

wherein R' is hydrogen; R comprises HO—$(CH_2)_m$—, or a moiety having a structure:

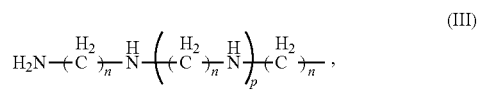

(III)

where m is an integer from 2-12, n is an integer from 2-10, p is an integer from 1-10; and the acrylamide has a formula:

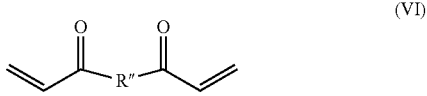

(VI)

wherein R" is a moiety having a structure:

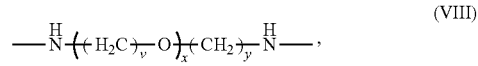

(VIII)

a moiety having a structure:

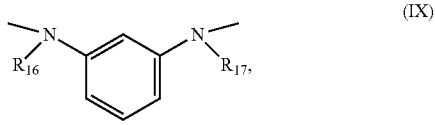

(IX)

or a substituted or unsubstituted triazinane ring or a piperazine ring, wherein v, x and y are independently integers of 1 to 10; $R_{16}$ and $R_{17}$ are independently chosen from hydrogen and carbonyl moiety, and with the proviso that when $R_{16}$ and $R_{17}$ are carbonyl moieties, the carbonyl moieties form a covalent bond with the carbons of the vinyl groups of formula (VI) displacing a hydrogen to form the covalent bond with the carbons of the vinyl groups to form a five membered heterocyclic ring.

2. The reaction product of claim 1, wherein the bisepoxide has the formula:

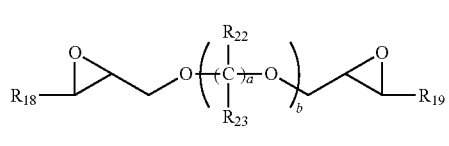

(XIII)

wherein $R_{18}$ and $R_{19}$ are independently chosen from hydrogen and $(C_1$-$C_4)$alkyl and $R_{22}$ and $R_{23}$ are independently chosen from hydrogen, methyl and hydroxyl, and a=1-6 and b=1-20.

3. The reaction product of claim 1, wherein R comprises HO—$(CH_2)_m$—, wherein m is an integer from 2-12.

4. The reaction product of claim 1, wherein R comprises a moiety having a structure:

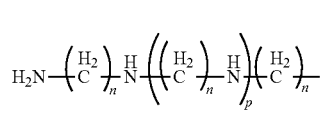

(III)

wherein n is an integer from 2-10 and p is an integer from 1-10.

5. The reaction product of claim 1, wherein R" is a moiety having a structure:

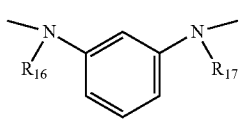

(IX)

wherein $R_{16}$ and $R_{17}$ are independently chosen from hydrogen and carbonyl moiety, and with the proviso that when $R_{16}$ and $R_{17}$ are carbonyl moieties, the carbonyl moieties form a covalent bond with the carbons of the vinyl groups of formula (VI) displacing a hydrogen to form the covalent bond with the carbons of the vinyl groups to form a five membered heterocyclic ring.

6. A reaction product of a bisepoxide, an amine and an acrylamide, wherein the amine has a formula:

(I)

wherein R' is hydrogen; R comprises HO—$(CH_2)_m$—, Q-$(CH_2)_m$—, a moiety having a structure:

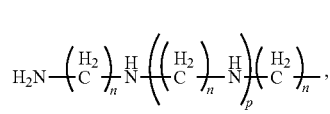

(III)

or a moiety having a structure:

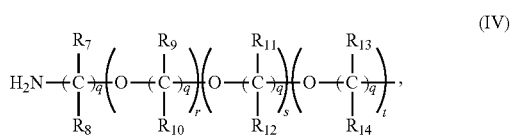

(IV)

where $R_7$-$R_{14}$ are independently chosen from hydrogen and $(C_1$-$C_3)$alkyl; m is an integer from 2-12, n is an integer from 2-10, p is an integer from 1-10, q is an integer from 2-10 and r, s and t are numbers from 1 to 10; Q is a 5-6 membered heterocyclic ring having one or two nitrogen atoms in the ring or Q is a benzene sulfonamide moiety; and the acrylamide has a formula:

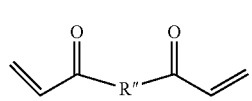

(VI)

wherein R" is a moiety having a structure:

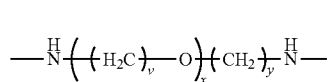

(VIII)

wherein v, x and y are independently integers of 1 to 10.

7. The reaction product of claim 6, wherein R comprises Q-$(CH_2)_m$—, wherein Q is a 5-6 membered heterocyclic ring having one or two nitrogen atoms in the ring or Q is a benzene sulfonamide moiety, and m is an integer from 2-12.

8. The reaction product of claim 6, wherein R comprises a moiety having a structure:

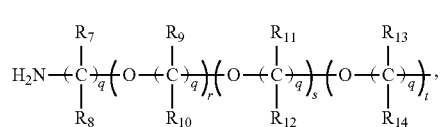

(IV)

wherein $R_7$-$R_{14}$ are independently chosen from hydrogen and $(C_1$-$C_3)$alkyl; q is an integer from 2-10 and r, s and t are numbers from 1 to 10.

9. A reaction product of a bisepoxide, an amine and an acrylamide, wherein the amine has a formula:

(I)

wherein R' is hydrogen; R comprises HO—$(CH_2)_m$—, Q-$(CH_2)_m$—, a moiety having a structure:

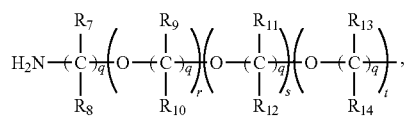 (III)

or
a moiety having a structure:

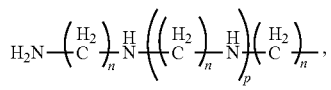 (IV)

where $R_7$-$R_{14}$ are independently chosen from hydrogen and ($C_1$-$C_3$)alkyl; m is an integer from 2-12, n is an integer from 2-10, p is an integer from 1-10, q is an integer from 2-10 and r, s and t are numbers from 1 to 10; Q is a 5-6 membered heterocyclic ring having one or two nitrogen atoms in the ring or Q is a benzene sulfonamide moiety; and the acrylamide has a formula:

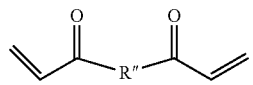 (VI)

wherein R" is a moiety having a substituted or unsubstituted triazinane ring or a piperazine ring.

* * * * *